(12) United States Patent
Kluge et al.

(10) Patent No.: US 11,518,229 B2
(45) Date of Patent: Dec. 6, 2022

(54) MOTOR VEHICLE TRANSMISSION FOR A HYBRID DRIVE TRAIN, AND HYBRID DRIVE TRAIN

(71) Applicant: Bayerische Motoren Werke Aktiengesellschaft, Munich (DE)

(72) Inventors: Benjamin Kluge, Munich (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/293,650

(22) PCT Filed: Oct. 24, 2019

(86) PCT No.: PCT/EP2019/078988
§ 371 (c)(1),
(2) Date: May 13, 2021

(87) PCT Pub. No.: WO2020/099087
PCT Pub. Date: May 22, 2020

(65) Prior Publication Data
US 2022/0009331 A1    Jan. 13, 2022

(30) Foreign Application Priority Data
Nov. 14, 2018  (DE) ..................... 10 2018 128 525.6

(51) Int. Cl.
*B60K 6/365* (2007.10)
*B60K 6/48* (2007.10)
*B60K 6/547* (2007.10)

(52) U.S. Cl.
CPC ................ *B60K 6/365* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS 7,179,187 B2 *  2/2007  Raghavan .............. B60K 6/445
                                                                475/5
7,192,373 B2 *  3/2007  Bucknor ................. F16H 3/728
                                                                475/5
(Continued)

FOREIGN PATENT DOCUMENTS

DE   11 2008 003 048 T5   9/2010
DE   10 2010 035 209 A1   3/2012
(Continued)

OTHER PUBLICATIONS

PCT/EP2019/078988, International Search Report dated Feb. 13, 2020 (Two (2) pages).
(Continued)

*Primary Examiner* — Dirk Wright
(74) *Attorney, Agent, or Firm* — Crowell & Moring LLP

(57) ABSTRACT

A motor vehicle transmission for a hybrid drive train of a motor vehicle includes a first transmission input shaft for receiving drive power of a first drive machine and a second transmission input shaft for receiving drive power from a second drive machine. A first planetary transmission gear set includes a first sun pinion, a first internal gear, and a first planetary gear carrier. A second planetary transmission gear set includes a second sun pinion, a second internal gear, and a second planetary gear carrier. The first internal gear is selectively connectable fixedly to a transmission housing so as to rotate with the transmission housing by a first braking device and the second internal gear is selectively connectable fixedly to a transmission output shaft so as to rotate with the transmission output shaft by a first clutch device.

11 Claims, 6 Drawing Sheets

(52) U.S. Cl.
CPC ... *B60K 2006/4825* (2013.01); *B60Y 2200/92* (2013.01); *B60Y 2400/73* (2013.01); *F16H 2200/201* (2013.01); *F16H 2200/2046* (2013.01)

(56) References Cited

U.S. PATENT DOCUMENTS

| | | | | |
|---|---|---|---|---|
| 7,300,374 | B2 * | 11/2007 | Bucknor | ............ F16H 3/728 |
| | | | | 475/5 |
| 7,500,930 | B2 * | 3/2009 | Raghavan | ............ F16H 3/728 |
| | | | | 475/5 |
| 7,699,735 | B2 * | 4/2010 | Conlon | ............ B60W 10/02 |
| | | | | 475/5 |
| 7,972,237 | B2 | 7/2011 | Ota | |
| 8,721,482 | B2 * | 5/2014 | Takami | ............ B60K 6/547 |
| | | | | 475/5 |
| 2011/0220428 | A1 * | 9/2011 | Ando | ............ B60L 50/16 |
| | | | | 903/902 |
| 2019/0344772 | A1 * | 11/2019 | Kluge | ............ B60W 10/113 |

FOREIGN PATENT DOCUMENTS

| | | | | |
|---|---|---|---|---|
| DE | 102010035209 A1 * | 3/2012 | ............ | B60K 6/365 |
| DE | 10 2016 101 063 A1 | 7/2017 | | |
| DE | 10 2016 224 458 A1 | 6/2018 | | |
| DE | 10 2017 204 971 B3 | 9/2018 | | |
| DE | 102018128525 A1 * | 5/2020 | ............ | B60K 6/365 |

OTHER PUBLICATIONS

German-language German Office Action issued in German application No. 10 2018 128 525.6 dated Jul. 17, 2019 (Five (5) pages).

* cited by examiner

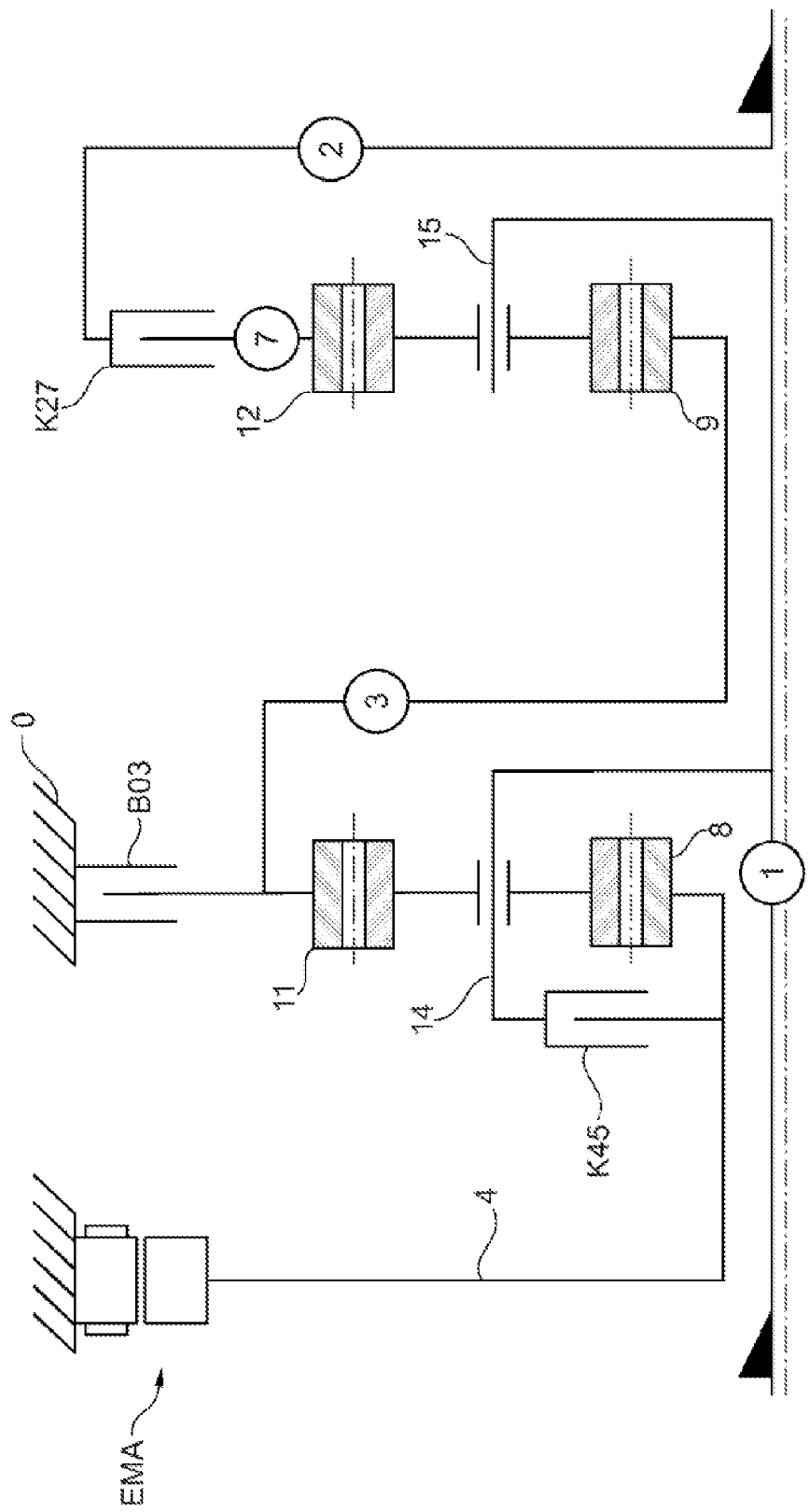

MOTOR VEHICLE TRANSMISSION FOR A HYBRID DRIVE TRAIN, AND HYBRID DRIVE TRAIN

BACKGROUND AND SUMMARY OF THE INVENTION

The invention relates to a motor vehicle transmission for a hybrid drive train; transmissions of this type are known from the prior art, in particular from DE 10 2017 204 971 A1.

In the following text, the invention will be described on the basis of a passenger car hybrid drive train; this is not to be understood as a restriction of the invention.

Current hybrid transmissions are based as a rule on conventional automatic transmissions which are designed for a purely internal combustion engine-driven drive train. For hybridization, an electromechanical energy converter is also additionally integrated as a second drive machine into the installation space which is in any case already limited. This can result in a disadvantage that usually only a limited electrification, in particular in relation to the drive power which can be provided electrically, can be achieved on account of the limited installation space, that is to say only a relatively small drive/propulsion power is made possible via the purely electric propulsion drive. In addition, a conventional automatic transmission of this type which is developed further to form the hybrid transmission is not designed in a targeted manner for a hybrid drive train.

DE 10 2017 204 971 A1 proposes a hybrid transmission for coupling an electric motor and an internal combustion engine. The drive power which can be provided by the drive machines can be transmitted by means of an epicyclic transmission with a plurality of planetary transmission gear sets.

It is an object of the invention to indicate a motor vehicle transmission for a hybrid drive with a small installation space requirement, which motor vehicle transmission can be shifted in discrete steps, in relation to the transmission ratio.

Within the context of the invention, a motor vehicle transmission for a hybrid drive train is to be understood to mean a change-speed transmission which has a transmission input shaft for receiving drive power from a drive machine, preferably an internal combustion engine and with preference a combustion engine of reciprocating piston design. Furthermore, the transmission has a transmission output shaft which can be coupled in order to output the received drive power in the direction of one or preferably a plurality of drivable motor vehicle axles with one or more drivable wheels, for the transmission of the drive power to the roadway surface. A drivable motor vehicle axle of this type is preferably set up as a front axle and with preference a rear axle; in particular, what are known as all wheel drive motor vehicles have both a drivable front and rear axle. In addition, the transmission has a second transmission input shaft which is coupled to a second drive machine, preferably an electric motor/generator, what is known as an electromechanical energy converter.

The motor vehicle transmission is configured as a shiftable transmission, and the drive power can therefore be transmitted with different, preferably discrete, transmission ratios from at least one of the transmission input shafts, in particular from the first transmission input shaft, to the transmission output shaft. A transmission ratio of this type is to be understood to mean, in particular, what is known as a gear or what is known as a shift stage.

Furthermore, the motor vehicle transmission has a transmission housing. The transmission housing is set up, in particular, for the rotatable mounting of at least one of the transmission input shafts (first, second) and the transmission output shaft.

Within the context of the invention, a planetary transmission gear set is to be understood to mean an epicyclic transmission gear set which has a sun gear, an internal gear and a planetary gear which is mounted rotatably on a spider shaft. A planetary transmission gear set of this type preferably has a multiplicity of planetary gears. The planetary gear is in engagement, in particular, both with the internal gear and with the sun pinion. An epicyclic transmission gear set of this type is known from the prior art as what is known as a negative gear set.

The epicyclic transmission gear set preferably has a planetary gear and a positive planetary gear, preferably a multiplicity of planetary gears and positive planetary gears of this type which are mounted in each case rotatably on the spider shaft and are in engagement with one another. In particular, the planetary gear is in engagement with the sun pinion, and the positive planetary gear is in engagement with the internal gear. An epicyclic transmission gear set of this type is known from the prior art as what is known as a positive gear set or positive planetary transmission gear set.

The motor vehicle transmission has at least two, preferably three, planetary transmission gear sets of this type and, further preferably, the motor vehicle transmission does not have more than three of the planetary transmission gear sets. Accordingly, the first planetary transmission gear set has a first sun pinion, a first internal gear and a first planetary gear carrier with a planetary gear or planetary gears mounted rotatably thereon. The second planetary transmission gear set has a second sun pinion, a second internal gear and a second planetary gear carrier with a planetary gear or planetary gears mounted rotatably thereon. A third, optionally present, planetary transmission gear set has a third sun pinion, a third internal gear and a third planetary gear carrier with a planetary gear or planetary gears mounted rotatably thereon.

All of the existing planetary transmission gear sets are preferably arranged concentrically with respect to one another, in particular are arranged concentrically with respect to a common central axis and, further preferably, the planetary transmission gear sets are arranged spaced apart axially from one another along the central axis.

In the direction from the first transmission input shaft to the transmission output shaft, the first and second planetary transmission gear sets are preferably arranged geometrically in the sequence first planetary transmission gear set in front of the second planetary transmission gear set. In the direction from the first transmission input shaft to the transmission output shaft, three planetary transmission gear sets are preferably arranged geometrically in the sequence first, third, second planetary transmission gear set. A motor vehicle transmission for a hybrid drive train with a small installation space requirement can be produced, in particular, by means of an arrangement of this type of the planetary transmission gear sets.

All of the planetary transmission gear sets are preferably configured as what are known as positive gear sets; with preference, all of the planetary transmission gear sets are configured as what are known as negative gear sets; and, particularly preferably, at least one of the planetary transmission gear sets is configured as what is known as a positive gear set and the other planetary transmission gear set or sets is/are configured as what are known as negative gear sets, or vice versa. In order to ensure the same functionality of the provided transmission, it is provided, in the case of the negative planetary transmission gear set being swapped for the positive planetary transmission gear set, for the attachment of shafts and shifting elements which are coupled to the planetary carrier and the planetary internal gear to likewise be swapped.

Within the context of the invention, a fixed connection so as to rotate together is to be understood to mean that, in the case of the transmission of torque from a first component to a second component, the second component has the same rotational speed as the first component, to which it is connected fixedly so as to rotate together. Components which are connected fixedly to one another so as to rotate together preferably make contact directly, or are connected to one another indirectly by means of a shaft/shaft device and therefore without a rotational speed difference in the case of the transmission of power. A selectively shiftable torque transmission device, preferably a brake, with preference a clutch, is preferably arranged between the two components (in relation to the transmission of power) for the selectively fixed connection of the two components to one another so as to rotate together. A torque transmission device of this type provides the possibility of the two components being selectively connected fixedly to one another so as to rotate together.

Within the context of the invention, a selective connection of two components is to be understood to mean that a connection of this type for the transmission of torque can selectively be established and canceled again. A torque transmission device of the abovementioned type, preferably a shifting element, is preferably provided in order to establish a selective connection of this type.

Components which are connected fixedly to one another so as to rotate together preferably have the same rotational axis in the case of the transmission of power. In the special case of a fixed connection of a component to the transmission housing so as to rotate together (transmission housing is at a standstill), in particular, the rotational speed of zero is stipulated for the component which is connected to the transmission housing; the component is at a standstill and a transmission of power is not possible.

A torque transmission device is preferably to be understood to mean a device for selectively establishing a torque-conducting connection, preferably, that is to say, a selectively switchable clutch or a selectively switchable brake. Within the context of the invention, a clutch of this type is also to be understood to mean a synchronizing means, preferably a single-cone or multiple-cone synchronizing means, as are known from shiftable transmissions in automotive engineering. Two components which are mounted such that they can be rotated can be connected to one another, in particular, by way of a clutch; a component which is mounted such that it can be rotated and a component which is permanently at a standstill, in particular the transmission housing, can be connected to one another, in particular, by way of a brake. A torque transmission device of this type is preferably configured as a positively locking or frictionally locking device and, with preference, as a frictionally/positively locking device. The abovementioned synchronizing means is to be understood, in particular, as a frictionally/positively locking device.

By means of selectively switchable connections of this type, in particular, the provided motor vehicle transmission can be shifted into different states, in particular different transmission stages and preferably into different operating states for the transmission of power. In particular, frictionally locking torque transmission devices have proven to be satisfactorily controllable devices for this purpose, by way of which a torque can be transmitted between components even if the components are not initially running at synchronous speeds (identical rotational speed of the components which are to be coupled to one another). In particular, positively locking torque transmission devices have proven particularly advantageous for the transmission of great torques in a small installation space, in comparison with frictionally locking torque transmission devices.

The second drive machine is configured as an electromechanical energy converter, and can preferably be operated both as an electric generator (drive power is output via the second transmission input shaft to the second drive machine) and as an electric motor (drive power is output via the second transmission input shaft from the second drive machine).

In the case of the provided motor vehicle transmission, the second transmission input shaft is connected fixedly to the first sun pinion so as to rotate with it. Furthermore, a first transmission input shaft can be selectively connected fixedly to the first planetary gear carrier so as to rotate with it, or is connected fixedly to the first planetary gear carrier so as to rotate with it. The transmission output shaft which is set up for the output of drive power from the motor vehicle transmission, in particular to a drive train of a motor vehicle, can be selectively connected fixedly to the second internal gear so as to rotate with it. The first internal gear is connected fixedly to the second sun pinion so as to rotate with it. In particular, a compact construction can be achieved by way of the provided "basic topology" of the motor vehicle transmission.

In order to provide different transmission stages, it is provided that a first braking device is provided which is set up for selectively connecting the first internal gear fixedly to the transmission housing so as to rotate with it. Furthermore, it is provided that a first clutch device is provided in the motor vehicle transmission, which first clutch device is provided for selectively connecting the second internal gear fixedly to the transmission output shaft so as to rotate with it. Tests have shown that a step range of the motor vehicle which is favorable for a hybrid drive train, with regard to the gears which can be produced, can be achieved by way of an arrangement of the two torque transmission devices at the indicated locations.

In one preferred embodiment of the invention, a second braking device is provided which is set up for selectively connecting the second transmission input shaft fixedly to the transmission housing so as to rotate with it.

In one preferred embodiment of the invention, a second clutch device is provided which is set up for selectively connecting the first sun pinion fixedly to the first planetary gear carrier so as to rotate with it. As an alternative to the embodiment, a further embodiment of the invention is provided, in the case of which the first sun pinion can selectively be connected by way of the second clutch device fixedly to the first internal gear so as to rotate with it. As an alternative to the embodiment, a further embodiment of the invention is provided, in the case of which the first internal gear can be connected by way of the second clutch device to the first planetary gear carrier. By way of a second clutch device of this type, in particular, two elements of the first planetary transmission gear set can thus be connected to one another in such a way that a transmission of power without rolling power losses is made possible by way of this.

In one preferred embodiment of the invention, a third clutch device is provided which is set up for selectively connecting the first transmission input shaft fixedly to the first planetary gear carrier so as to rotate with it. By way of a selective connection, in particular, a possibility for changing the transmission ratio of the motor vehicle transmission is specified in a simple way.

In one embodiment of the invention which is an alternative to the preceding embodiment, the first transmission input shaft is connected fixedly to the second planetary gear carrier so as to rotate with it. By way of a permanently rotationally locked connection, in particular, a particularly simple construction of the motor vehicle transmission can be achieved.

In one preferred embodiment of the invention, the first internal gear is connected fixedly to the second sun pinion so as to rotate with it.

In one preferred embodiment of the invention, the first planetary gear carrier is connected fixedly to the second planetary gear carrier so as to rotate with it.

In one preferred embodiment, in addition to the first and the second planetary transmission gear set, the motor vehicle transmission also has a third planetary transmission gear set with a third sun pinion, a third internal gear and a third planetary gear carrier with at least one third planetary gear which is mounted rotatably on it. The motor vehicle transmission preferably has precisely these three planetary transmission gear sets. The third planetary transmission gear set, in particular, provides the possibility of providing more shiftable transmission ratios by way of the motor vehicle transmission in comparison with an embodiment with two planetary transmission gear sets.

In one preferred embodiment of the invention, a third braking device is provided which is set up for selectively connecting the third internal gear fixedly to the transmission housing so as to rotate with it. In particular, by way of a torque transmission device which is arranged at the proposed position, a favorable step range of the motor vehicle in relation to the shiftable transmission ratios can be achieved.

In one preferred embodiment of the invention, the third planetary gear carrier is connected fixedly to the transmission output shaft so as to rotate with it. By way of the rotationally fixed connection, in particular, a simple construction of the motor vehicle transmission can be achieved.

In one preferred embodiment of the invention, the third sun pinion is connected fixedly to the second sun pinion and the first internal gear so as to rotate with them. By means of the provided connection, in particular, a compact construction of the motor vehicle transmission can be achieved.

The first planetary transmission gear set with preference has a stationary transmission ratio $i_{01-I}$ which is selected from a range for which the following applies: $i_{01-I}$ is smaller than −1.2, preferably smaller than −1.5 and particularly preferably smaller than −2, and greater than −3.5, preferably greater than −3 and particularly preferably greater than −2.4. The second planetary transmission gear set with preference has a stationary transmission ratio $i_{01-II}$ which is selected from a range for which the following applies: $i_{01-II}$ is smaller than −1.2, preferably smaller than −1.3 and particularly preferably smaller than −1.8, and greater than −3.5, preferably greater than −2.8 and particularly preferably greater than −2.2. The third planetary transmission gear set with preference has a stationary transmission ratio $i_{01-II}$ which is selected from a range for which the following applies: $i_{01-III}$ is smaller than −1.2, preferably smaller than −1.7 and particularly preferably smaller than −2.0, and with preference greater than −3.5, preferably greater than −3.0 and particularly preferably greater than −2.6. In the case of the use of positive planetary transmission gear sets, in particular, values for the stationary transmission ratio apply correspondingly with opposite signs, that is to say in particular values of from 1.2 to 3.5.

The first braking device makes it possible to realize additional functionalities for the motor vehicle:

Firstly, this is a parking lock functionality which can be achieved in combination with the third braking device (both engaged); if the first and the third braking device are closed, the motor vehicle transmission is locked and rotation of the transmission output shaft with respect to the transmission housing is prevented. This shifting pattern affords the advantage in comparison with known parking lock shifting patterns, in particular, that an internal combustion engine which is coupled to the first transmission input shaft can be started via the first transmission input shaft by means of the second drive machine and, further advantageously, its charging at a standstill (internal combustion engine drives second drive machine in the case of a stationary vehicle) is also made possible via a serial mode. Furthermore, an embodiment of this type makes it possible that the second drive machine is attached to the internal combustion engine with a step-up transmission ratio, and this has the consequence that starting of the internal combustion engine can take place in a more comfortable and more efficient manner than in directly coupled serial mode (transmission ratio=1), since the second drive machine can operate at a lower torque level.

Moreover, in each case one of the brakes of the parking lock functionality can be relieved, only in conjunction with the parking lock functionality, by means of the second drive machine, or second drive machine and the internal combustion engine, even with bracing of the power train. The relieving makes load-free opening and closing of the brakes of the parking lock functionality possible.

In addition, an alternative gear can be shifted via the first braking device, in the case of which alternative gear the second transmission input shaft remains capable of rotation with respect to the transmission housing, and the second drive machine can thus be used for driving or for recuperation.

Furthermore, a hybrid drive train, that is to say a drive train for a hybrid vehicle, is provided. The drive train has the above-described motor vehicle transmission. Furthermore, the drive train has an internal combustion engine which is set up for providing drive power for overcoming driving resistances of the hybrid vehicle. The drive power of the internal combustion engine can be transmitted to the first transmission input shaft, preferably by way of a torque transmission device which can be shifted selectively.

Therefore, the internal combustion engine can preferably be selectively connected fixedly to the transmission input shaft so as to rotate with it or, further preferably, is connected fixedly to the transmission input shaft so as to rotate with it. Further preferably, the drive train has a power train. In this context, the power train is to be understood to mean a device for the transmission of power from the motor vehicle transmission to at least one drivable wheel of the hybrid vehicle. The drivable wheel is preferably configured as a wheel/tire combination which is set up for the transmission of power from the drive train to a roadway surface. The transmission output shaft is preferably at least temporarily or permanently connected fixedly to the power train so as to rotate with it. Tests have shown that a drive train of this type can represent a drive train which has a comparatively simple construction and a comparatively high degree of efficiency in comparison with drive trains which are known from the prior art.

The provided drive train is preferably suitable for what is known as an in-line drive architecture and configured therefor. A drive architecture of this type is to be understood to mean, in particular, the arrangement of the internal combustion engine in the longitudinal direction, in relation to the driving direction of the vehicle, with a motor vehicle transmission which adjoins it directly. An arrangement of this type of the drive train is known from the prior art in general as a front longitudinal drive or as a standard drive. As an alternative, the provided drive train is configured as what is known as a front transverse drive architecture. In addition to front transverse and in-line, an axially parallel arrangement of the transmission, the combustion engine and the electric machine is preferably also made possible, which allows a particularly compact and flexible drive.

In the case of the provided motor vehicle transmission, furthermore, it is possible for at least the internal combustion engine or the second drive machine or both, depending on the type of power train (in-line, front transverse, axially parallel) to be attached with an extra step-up transmission ratio to the motor vehicle transmission. In particular in the axially parallel case, an attachment of this type with a step-up transmission ratio is preferred. Furthermore, the internal combustion engine is preferably attached to a rotational non-uniformity damping/absorbing system.

In the following text, individual features and embodiments of the invention will be described in greater detail on the basis of the partially diagrammatic figures.

BRIEF DESCRIPTION OF THE DRAWINGS

FIG. 6 shows a diagrammatic longitudinal section of a sixth embodiment of the motor vehicle transmission.

DETAILED DESCRIPTION OF THE DRAWINGS

Figure 1:
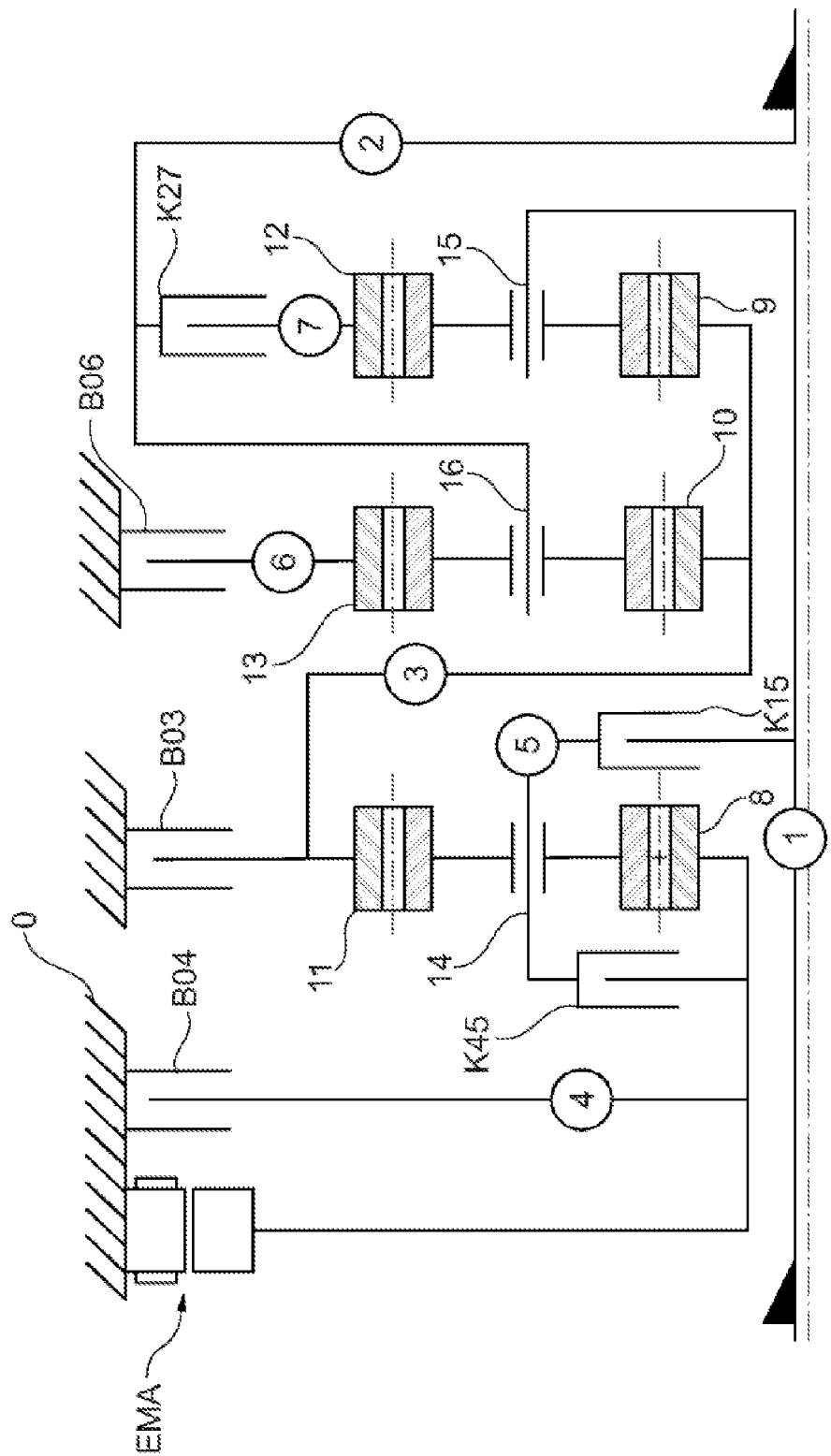
FIG. 1 shows a diagrammatic longitudinal section of a first embodiment of the motor vehicle transmission.

That embodiment of the motor vehicle transmission which is shown in FIG. 1 has six shiftable forward gears, and is one preferred embodiment for a motor vehicle with electric all wheel drive.

An internal combustion engine can be coupled (not shown) to the first transmission input shaft 1. The second drive machine EMA is connected via the first sun pinion shaft 4 fixedly to the first sun pinion 8 so as to rotate with it. By means of the first sun pinion shaft 4 and the second brake B04, the first sun pinion 8 can selectively be connected fixedly to the transmission housing 0 so as to rotate with it. A first planetary gear is mounted rotatably on the first planetary gear carrier 14, which first planetary gear meshes both with the first sun pinion 8 and with the first internal gear 11 for the transmission of power. The first internal gear 11 is connected fixedly to the third sun pinion 10 and the second sun pinion 9 so as to rotate with them, and the first internal gear 11 can also be selectively connected via the first internal gear shaft 3, by means of the first brake B03, fixedly to the transmission housing 0 so as to rotate with it.

A second planetary gear is mounted rotatably on the second planetary gear carrier 15, which second planetary gear meshes both with the second pinion shaft 9 and with the second internal gear 12 for the transmission of power. The second internal gear 12 can be selectively connected by way of the second internal gear shaft 7 and the first clutch K27 fixedly to the transmission output shaft 2 so as to rotate with it. Furthermore, the transmission output shaft 2 is connected fixedly to the third planetary gear carrier 16 so as to rotate with it, on which third planetary gear carrier 16 a third planetary gear is mounted rotatably. The third planetary gear meshes both with the third sun pinion 10 and with the third internal gear 13 for the transmission of power. The second clutch K45 is provided to block the first planetary transmission gear set, by way of which second clutch K45 the first sun pinion shaft 4 and the first planetary gear carrier shaft 5 and therefore the first sun pinion 8 and the first planetary gear carrier 14 can be selectively connected fixedly to one another so as to rotate together.

The third internal gear 13 can selectively be connected by way of the third internal gear shaft 6 and the third brake B06 fixedly to the transmission housing 0 so as to rotate with it. Furthermore, the third clutch K15 is provided which is set up for selectively connecting the first transmission input shaft 1 fixedly to the first planetary gear carrier shaft 5 and therefore to the first planetary gear carrier 14 so as to rotate with them.

Figure 2:
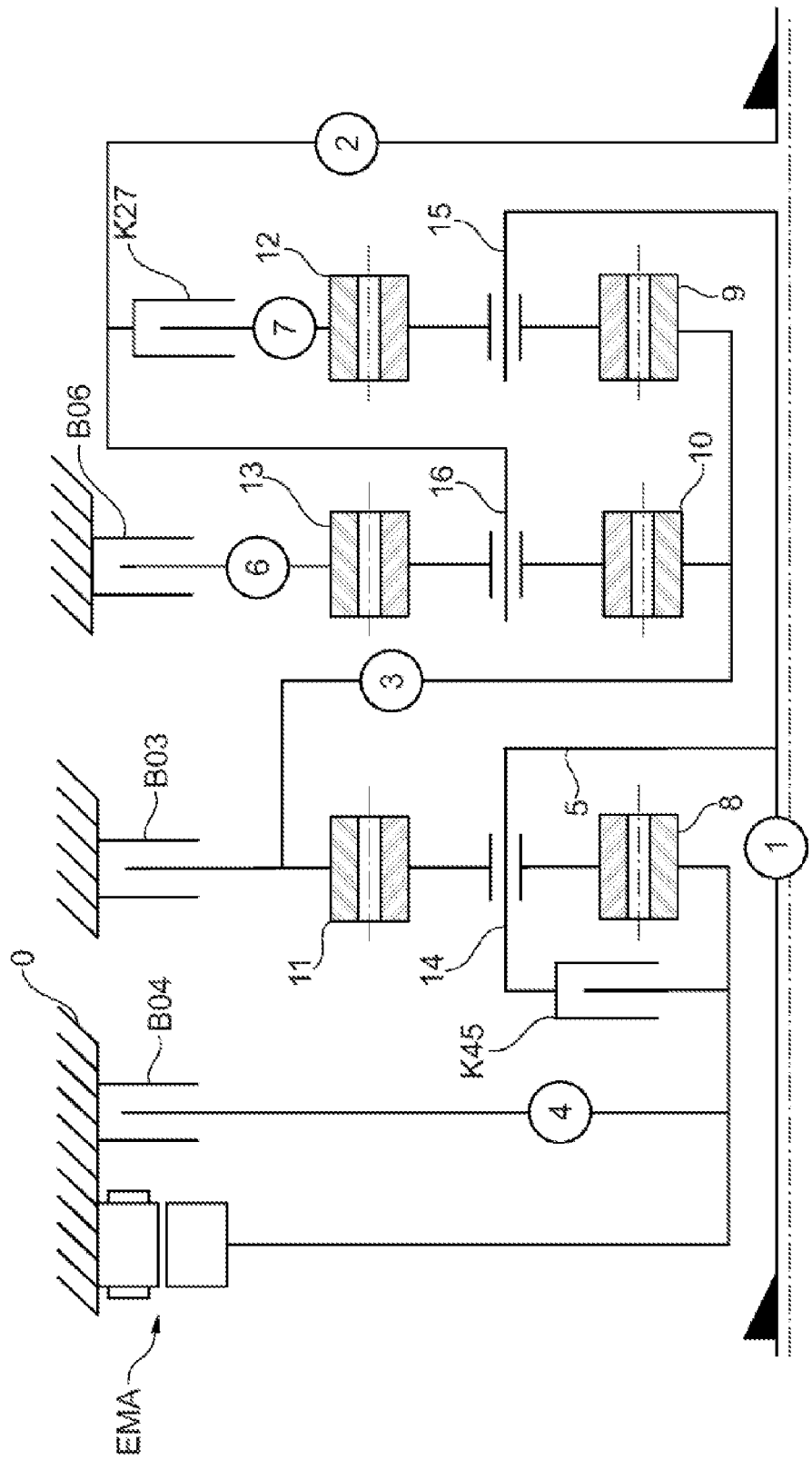
FIG. 2 shows a diagrammatic longitudinal section of a second embodiment of the motor vehicle transmission.

That embodiment of the motor vehicle transmission which is shown in FIG. 2 has six shiftable forward gears, and is one preferred embodiment for a motor vehicle without electric all wheel drive.

An internal combustion engine can be coupled (not shown) to the first transmission input shaft 1. The second drive machine EMA is connected via the first sun pinion shaft 4 fixedly to the first sun pinion 8 so as to rotate with it. By means of the first sun pinion shaft 4 and the second brake B04, the first sun pinion 8 can be selectively connected fixedly to the transmission housing 0 so as to rotate with it. A first planetary gear is mounted rotatably on the first planetary gear carrier 14, which first planetary gear meshes both with the first sun pinion 8 and with the first internal gear 11 for the transmission of power. The first internal gear 11 is connected fixedly to the third sun pinion 10 and the second sun pinion 9 so as to rotate with them, and the first internal gear 11 can also be selectively connected via the first internal gear shaft 3, by means of the first brake B03, fixedly to the transmission housing 0 so as to rotate with it.

A second planetary gear is mounted rotatably on the second planetary gear carrier 15, which second planetary gear meshes both with the second sun pinion 9 and with the second internal gear 12 for the transmission of power. The second internal gear 12 can be selectively connected by way of the second internal gear shaft 7 and the first clutch K27 fixedly to the transmission output shaft 2 so as to rotate with it. Furthermore, the transmission output shaft 2 is connected fixedly to the third planetary gear carrier 16 so as to rotate with it, on which third planetary gear carrier 16 a third planetary gear is mounted rotatably. The third planetary gear meshes both with the third sun pinion 10 and with the third internal gear 13 for the transmission of power. The second clutch K45 is provided to block the first planetary transmission gear set, by way of which second clutch K45 the first sun pinion shaft 4 and the first planetary gear carrier shaft 5 and therefore the first sun pinion 8 and the first planetary gear carrier 14 can be selectively connected fixedly to one another so as to rotate together.

The third internal gear 13 can be selectively connected by way of the third internal gear shaft 6 and the third brake B06 fixedly to the transmission housing 0 so as to rotate with it. Furthermore, in contrast to the embodiment shown above, the first transmission input shaft 1 is connected fixedly to the first planetary gear carrier shaft 5 and therefore to the first planetary gear carrier 14 so as to rotate with them (omission of third clutch K15).

Figure 3:
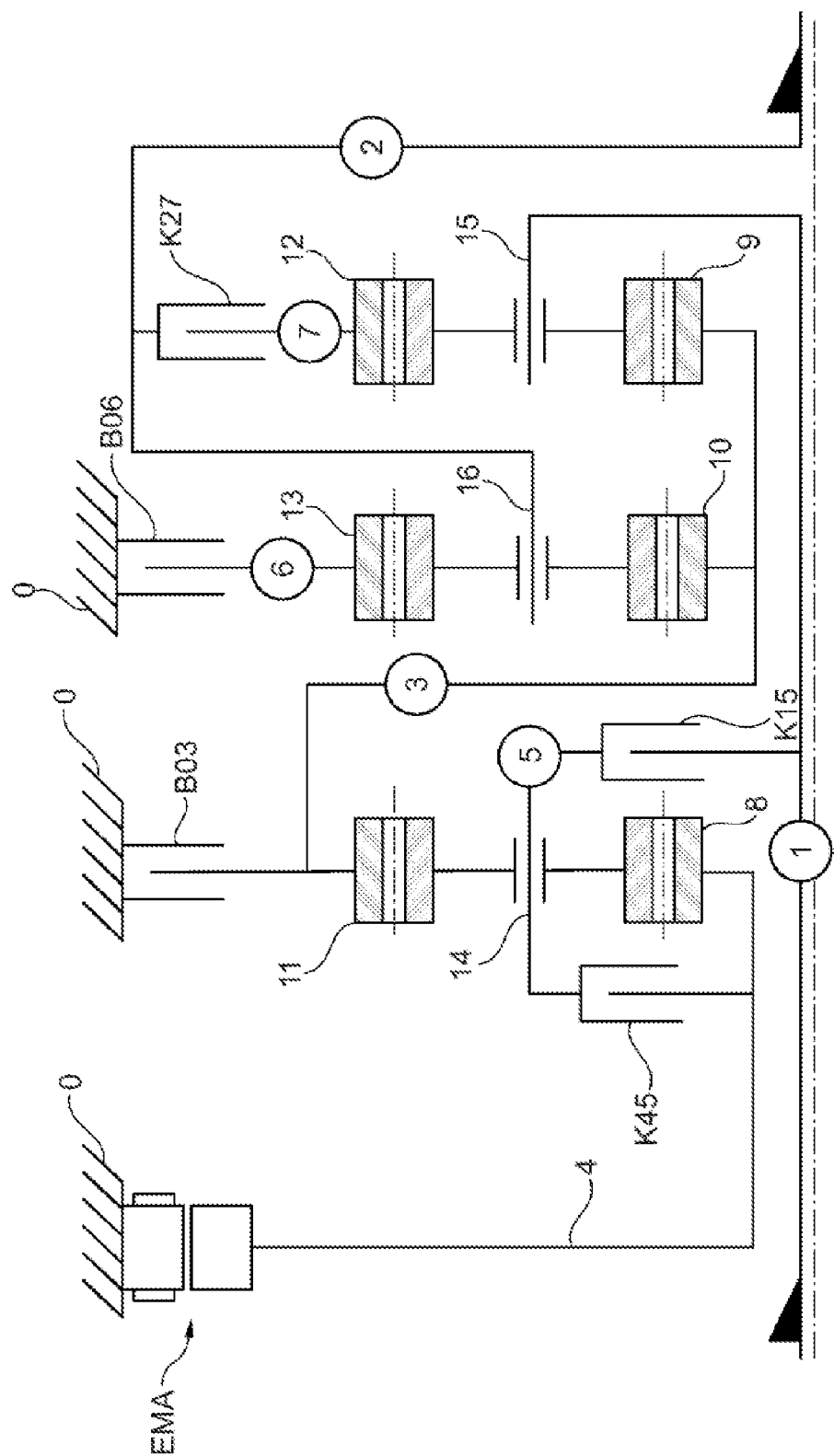
FIG. 3 shows a diagrammatic longitudinal section of a third embodiment of the motor vehicle transmission.

That embodiment of the motor vehicle transmission which is shown in FIG. 3 has four shiftable forward gears, and is one preferred embodiment for a motor vehicle with electric all wheel drive.

An internal combustion engine can be coupled (not shown) to the first transmission input shaft 1. The second drive machine EMA is connected via the first sun pinion shaft 4 fixedly to the first sun pinion 8 so as to rotate with it. A first planetary gear is mounted rotatably on the first planetary gear carrier 14, which first planetary gear meshes both with the first sun pinion 8 and with the first internal gear 11 for the transmission of power. The first internal gear 11 is connected fixedly to the third sun pinion 10 and the second sun pinion 9 so as to rotate with them, and the first internal gear 11 can also be selectively connected via the first internal gear shaft 3, by means of the first brake B03, fixedly to the transmission housing 0 so as to rotate with it.

A second planetary gear is mounted rotatably on the second planetary gear carrier 15, which second planetary gear meshes both with the second sun pinion 9 and with the second internal gear 12 for the transmission of power. The second internal gear 12 can be selectively connected by way of the second internal gear shaft 7 and the first clutch K27 fixedly to the transmission output shaft 2 so as to rotate with it. Furthermore, the transmission output shaft 2 is connected fixedly to the third planetary gear carrier 16 so as to rotate with it, on which third planetary gear carrier 16 a third planetary gear is mounted rotatably. The third planetary gear meshes both with the third sun pinion 10 and with the third internal gear 13 for the transmission of power. The second clutch K45 is provided to block the first planetary transmission gear set, by way of which second clutch K45 the first sun pinion shaft 4 and the first planetary gear carrier shaft 5 and therefore the first sun pinion 8 and the first planetary gear carrier 14 can be selectively connected fixedly to one another so as to rotate together.

The third internal gear 13 can be selectively connected by way of the third internal gear shaft 6 and the third brake B06 fixedly to the transmission housing 0 so as to rotate with it. Furthermore, the third clutch K15 is provided which is set up for selectively connecting the first transmission input shaft 1 fixedly to the first planetary gear carrier shaft 5 and therefore to the first planetary gear carrier 14 so as to rotate with them.

Furthermore, in contrast to the embodiments which are shown above, the second brake B04 is dispensed with, and the transmission can therefore be refined.

Figure 4:
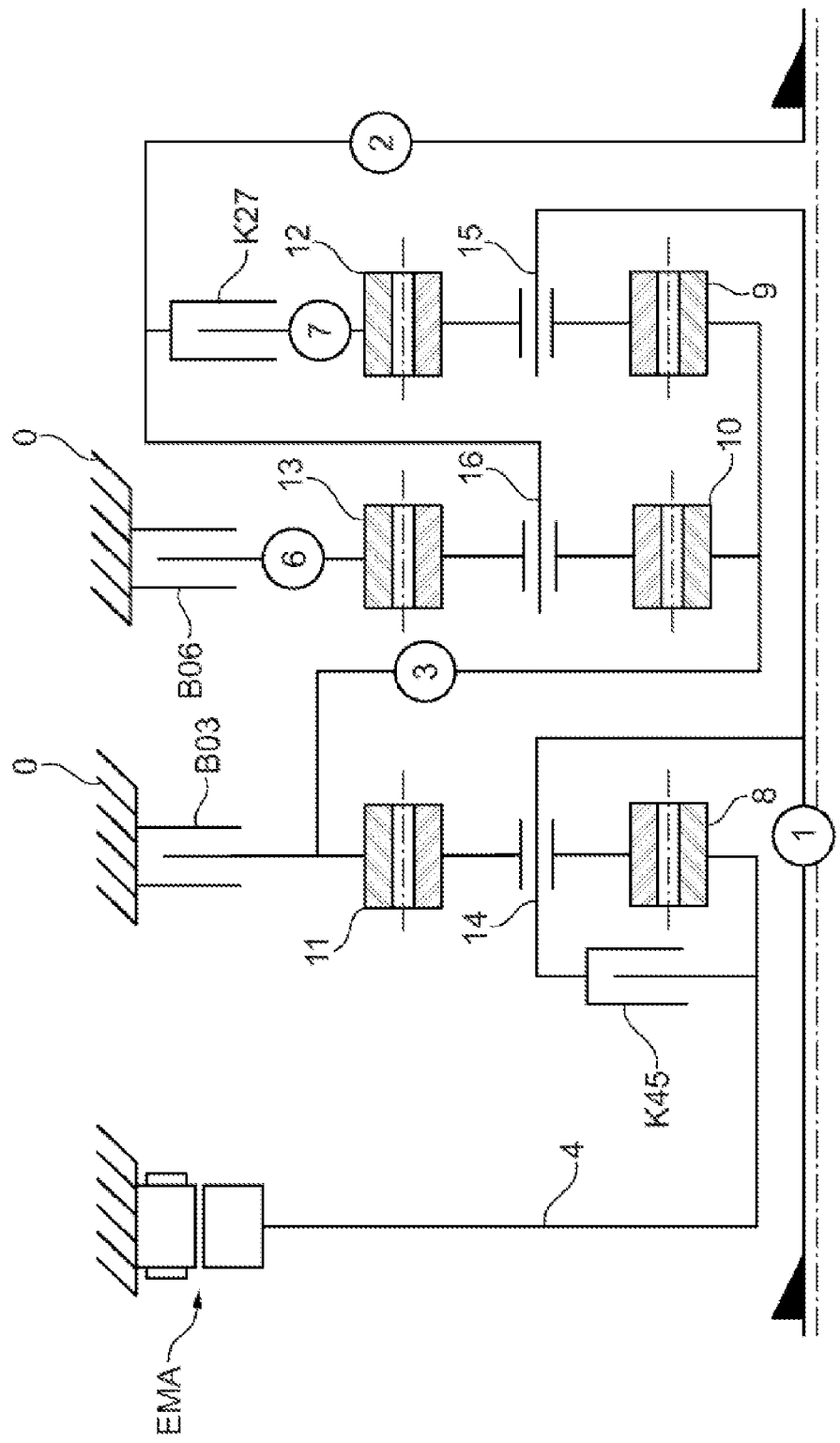
FIG. 4 shows a diagrammatic longitudinal section of a fourth embodiment of the motor vehicle transmission.

That embodiment of the motor vehicle transmission which is shown in FIG. 4 has four shiftable forward gears, and is one preferred embodiment for a motor vehicle without electric all wheel drive.

An internal combustion engine can be coupled (not shown) to the first transmission input shaft 1. The second drive machine EMA is connected via the first sun pinion shaft 4 fixedly to the first sun pinion 8 so as to rotate with it. A first planetary gear is mounted rotatably on the first planetary gear carrier 14, which first planetary gear meshes both with the first sun pinion 8 and with the first internal gear 11 for the transmission of power. The first internal gear 11 is connected fixedly to the third sun pinion 10 and the second sun pinion 9 so as to rotate with them, and the first internal gear 11 can also be selectively connected via the first internal gear shaft 3, by means of the first brake B03, fixedly to the transmission housing 0 so as to rotate with it.

A second planetary gear is mounted rotatably on the second planetary gear carrier 15, which second planetary gear meshes both with the second sun pinion 9 and with the second internal gear 12 for the transmission of power. The second internal gear 12 can be selectively connected by way of the second internal gear shaft 7 and the first clutch K27 fixedly to the transmission output shaft 2 so as to rotate with it. Furthermore, the transmission output shaft 2 is connected fixedly to the third planetary gear carrier 16 so as to rotate with it, on which third planetary gear carrier 16 a third planetary gear is mounted rotatably. The third planetary gear meshes both with the third sun pinion 10 and with the third internal gear 13 for the transmission of power. The second clutch K45 is provided to block the first planetary transmission gear set, by way of which second clutch K45 the first sun pinion shaft 4 and the first planetary gear carrier shaft 5 and therefore the first sun pinion 8 and the first planetary gear carrier 14 can be selectively connected to one another fixedly so as to rotate together.

The third internal gear 13 can be selectively connected by way of the third internal gear shaft 6 and the third brake B06 fixedly to the transmission housing 0 so as to rotate with it. Furthermore, in contrast to the embodiment which is shown above, the first transmission input shaft 1 is connected fixedly to the first planetary gear carrier shaft 5 and therefore to the first planetary gear carrier 14 so as to rotate with them (omission of third clutch K15).

Figure 5:
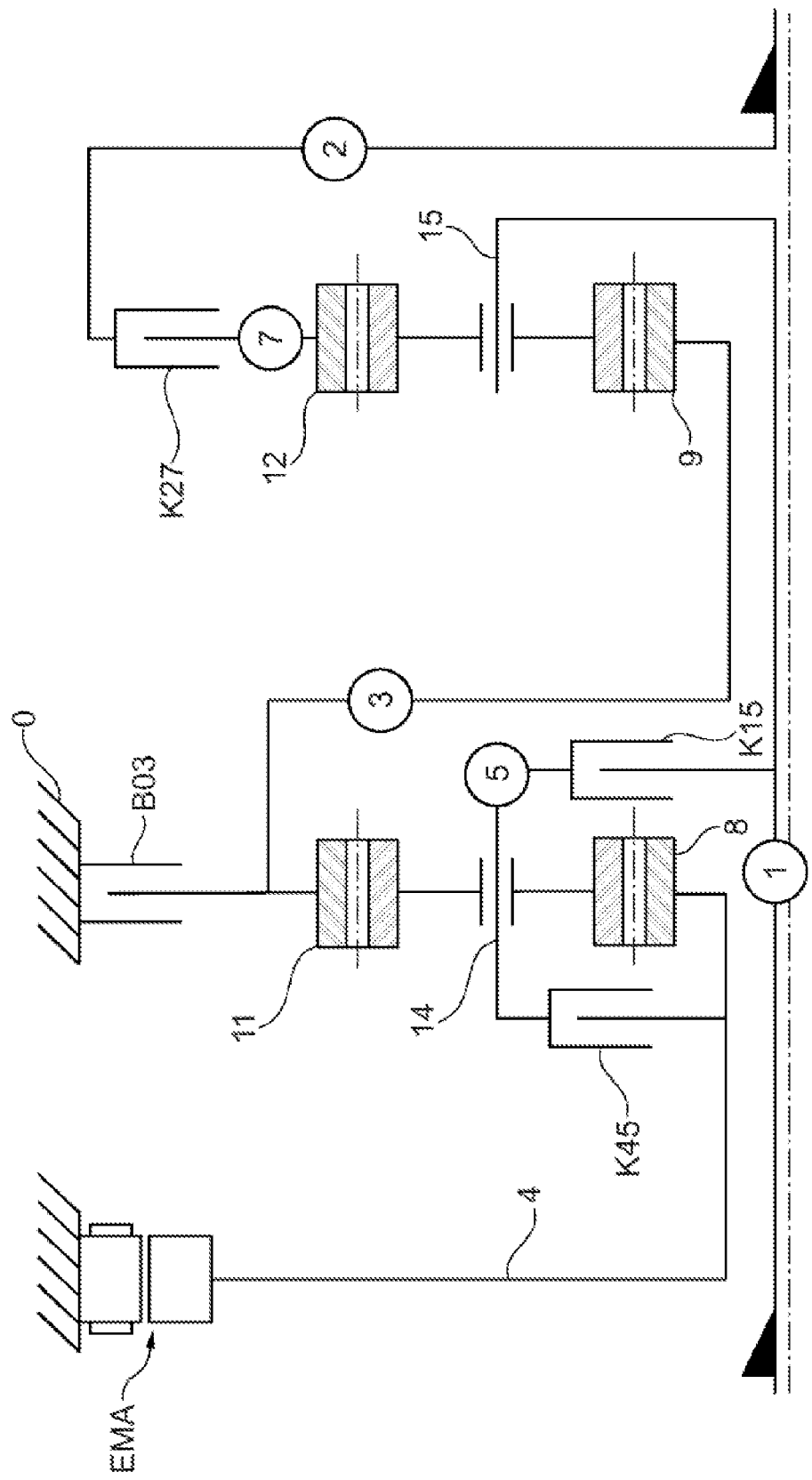
FIG. 5 shows a diagrammatic longitudinal section of a fifth embodiment of the motor vehicle transmission.

That embodiment of the motor vehicle transmission which is shown in FIG. 5 has two shiftable forward gears, and is one preferred embodiment for a motor vehicle with electric all wheel drive.

An internal combustion engine can be coupled (not shown) to the first transmission input shaft 1. The second drive machine EMA is connected via the first sun pinion shaft 4 fixedly to the first sun pinion 8 so as to rotate with it. A first planetary gear is mounted rotatably on the first planetary gear carrier 14, which first planetary gear meshes both with the first sun pinion 8 and with the first internal gear 11 for the transmission of power. The first internal gear 11 is connected fixedly to the second sun pinion 9 so as to rotate with it, and the first internal gear 11 can also be selectively connected via the first internal gear shaft 3, by means of the first brake B03, fixedly to the transmission housing 0 so as to rotate with it.

A second planetary gear is mounted rotatably on the second planetary gear carrier 15, which second planetary gear meshes both with the second sun pinion 9 and with the second internal gear 12 for the transmission of power. The second internal gear 12 can be selectively connected by way of the second internal gear shaft 7 and the first clutch K27 fixedly to the transmission output shaft 2 so as to rotate with it.

The second clutch K45 is provided to block the first planetary transmission gear set, by way of which second clutch K45 the first sun pinion shaft 4 and the first planetary gear carrier shaft 5 and therefore the first sun pinion 8 and the first planetary gear carrier 14 can be selectively connected fixedly to one another so as to rotate together.

Furthermore, the third clutch K15 is provided which is set up for selectively connecting the first transmission input shaft 1 fixedly to the first planetary gear carrier shaft 5 and therefore to the first planetary gear carrier 14 so as to rotate with them. The first planetary gear carrier 14 is connected via the first planetary gear carrier shaft 5 fixedly to the second planetary gear carrier 15 so as to rotate with it.

In contrast to the embodiments which are shown above, the third planetary transmission gear set is dispensed with, and the motor vehicle transmission can thus be refined.

That embodiment of the motor vehicle transmission which is shown in FIG. 6 has two shiftable forward gears, and is one preferred embodiment for a motor vehicle without electric all wheel drive.

An internal combustion engine can be coupled (not shown) to the first transmission input shaft 1. The second drive machine EMA is connected via the first sun pinion shaft 4 fixedly to the first sun pinion 8 so as to rotate with it. A first planetary gear is mounted rotatably on the first planetary gear carrier 14, which first planetary gear meshes both with the first sun pinion 8 and with the first internal gear 11 for the transmission of power. The first internal gear 11 is connected fixedly to the second sun pinion 9 so as to rotate with it, and the first internal gear 11 can also be selectively connected via the first internal gear shaft 3, by means of the first brake B03, fixedly to the transmission housing 0 so as to rotate with it.

A second planetary gear is mounted rotatably on the second planetary gear carrier 15, which second planetary gear meshes both with the second sun pinion 9 and with the second internal gear 12 for the transmission of power. The second internal gear 12 can be selectively connected by way of the second internal gear shaft 7 and the first clutch K27 fixedly to the transmission output shaft 2 so as to rotate with it.

The second clutch K45 is provided to block the first planetary transmission gear set, by way of which second clutch K45 the first sun pinion shaft 4 and the first planetary gear carrier shaft 5 and therefore the first sun pinion 8 and the first planetary gear carrier 14 can be selectively connected fixedly to one another so as to rotate together.

Furthermore, in contrast to the embodiment which is shown above, the first transmission input shaft 1 is connected fixedly to the first planetary gear carrier shaft 5 and therefore to the first planetary gear carrier 14 so as to rotate with them (omission of third clutch K15).

Furthermore, it is also the case that the first planetary gear carrier shaft 5 is not connected fixedly to the second planetary gear carrier 15 so as to rotate with it, but rather the first transmission input shaft 1 is connected fixedly to the second planetary gear carrier 15 so as to rotate with it.

LIST OF REFERENCE CHARACTERS

0 Transmission housing
1 First transmission input shaft
2 Transmission output shaft
3 First internal gear shaft
4 First sun pinion shaft
5 First planetary gear carrier shaft
6 Third internal gear shaft
7 Second internal gear shaft
8 First sun pinion
9 Second sun pinion
10 Third sun pinion
11 First internal gear
12 Second internal gear
13 Third internal gear
14 First planetary gear carrier
15 Second planetary gear carrier
16 Third planetary gear carrier
17 Second drive machine
B03 First brake
B04 Second brake
B06 Third brake
K27 First clutch
K45 Second clutch
K15 Third clutch
EMA Second drive machine

What is claimed is:

1. A motor vehicle transmission for a hybrid drive train of a motor vehicle, comprising:
   a first transmission input shaft for receiving drive power of a first drive machine;
   a second transmission input shaft for receiving drive power from a second drive machine, wherein the second drive machine is an electromechanical energy converter;
   a first planetary transmission gear set with a first sun pinion, a first internal gear, and a first planetary gear carrier on which a first planetary gear is mounted rotatably;
   a second planetary transmission gear set with a second sun pinion, a second internal gear, and a second planetary gear carrier on which a second planetary gear is mounted rotatably;
   wherein the second transmission input shaft is connected fixedly to the first sun pinion so as to rotate with the first sun pinion;
   wherein the first transmission input shaft is selectively connectable fixedly to the first planetary gear carrier so as to rotate with the first planetary gear carrier or the first transmission input shaft is connected fixedly to the first planetary gear carrier so as to rotate with the first planetary gear carrier;
   a transmission output shaft for an output of drive power from the transmission;
   wherein the transmission output shaft is selectively connectable fixedly to the second internal gear so as to rotate with the second internal gear;
   wherein the first internal gear is connected fixedly to the second sun pinion, without an intervening clutch, so as to rotate with the second sun pinion;
   a first braking device, wherein the first internal gear is selectively connectable fixedly to a transmission housing so as to rotate with the transmission housing by the first braking device; and
   a first clutch device, wherein the second internal gear is selectively connectable fixedly to the transmission output shaft so as to rotate with the transmission output shaft by the first clutch device.

2. The motor vehicle transmission according to claim 1 further comprising a second braking device, wherein the second transmission input shaft is selectively connectable fixedly to the transmission housing so as to rotate with the transmission housing by the second braking device.

3. The motor vehicle transmission according to claim 1 further comprising a second clutch device, wherein the first sun pinion is selectively connectable fixedly to the first planetary gear carrier so as to rotate with the first planetary gear carrier by the second clutch device, or the first sun pinion is selectively connectable fixedly to the first internal gear so as to rotate with the first internal gear by the second clutch device, or the first internal gear is selectively connectable fixedly to the first planetary gear carrier so as to rotate with the first planetary gear carrier by the second clutch device.

4. The motor vehicle transmission according to claim 1 further comprising a third clutch device, wherein the first transmission input shaft is selectively connectable fixedly to the first planetary gear carrier so as to rotate with the first planetary gear carrier by the third clutch device.

5. The motor vehicle transmission according to claim 1, wherein the first transmission input shaft is connected fixedly to the second planetary gear carrier so as to rotate with the second planetary gear carrier.

6. The motor vehicle transmission according to claim 1, wherein the first planetary gear carrier is connected fixedly to the second planetary gear carrier so as to rotate with the second planetary gear carrier.

7. The motor vehicle transmission according to claim 1 further comprising a third planetary transmission gear set with a third sun pinion, a third internal gear, and a third planetary gear carrier on which a third planetary gear is mounted rotatably.

8. The motor vehicle transmission according to claim 7 further comprising a third braking device, wherein the third internal gear is selectively connectable fixedly to the transmission housing so as to rotate with the transmission housing by the third braking device.

9. The motor vehicle transmission according to claim 7, wherein the third planetary gear carrier is connected fixedly to the transmission output shaft so as to rotate with the transmission output shaft.

10. The motor vehicle transmission according to claim 7, wherein the third sun pinion is connected fixedly to the second sun pinion and the first internal gear so as to rotate with the second sun pinion and the first internal gear.

11. A hybrid drive train for a motor vehicle, comprising:
the motor vehicle transmission according to claim 1; and
a first drive machine which is selectively connectable fixedly to the first transmission input shaft, wherein the first drive machine is an internal combustion engine.

* * * * *